US012632960B2

(12) United States Patent
Yang et al.

(10) Patent No.: US 12,632,960 B2
(45) Date of Patent: May 19, 2026

(54) CIGAR TOBACCO LEAF HARVESTING MATURITY IDENTIFICATION METHOD AND SYSTEM BASED ON INTEGRATED LEARNING

(71) Applicant: Hubei Provincial Tobacco Research Institute, Wuhan city (CN)

(72) Inventors: Chunlei Yang, Wuhan city (CN); Guangwei Sun, Wuhan city (CN); Jinpeng Yang, Wuhan city (CN); Jun Yu, Wuhan city (CN); Xiongfei Rao, Wuhan city (CN); Wencan Pei, Wuhan city (CN); Xiaowei Liu, Wuhan city (CN); Jing Liu, Wuhan city (CN); Jinguo Huang, Wuhan city (CN)

(73) Assignee: Hubei Provincial Tobacco Research Institute (CN)

( * ) Notice: Subject to any disclaimer, the term of this patent is extended or adjusted under 35 U.S.C. 154(b) by 395 days.

(21) Appl. No.: 18/332,927

(22) Filed: Jun. 12, 2023

(65) Prior Publication Data

US 2024/0013380 A1      Jan. 11, 2024

(30) Foreign Application Priority Data

Jul. 8, 2022    (CN) .......................... 202210800957.9

(51) Int. Cl.
*G06T 7/00*        (2017.01)
*G06T 5/00*        (2024.01)
(Continued)

(52) U.S. Cl.
CPC .............. *G06T 7/0012* (2013.01); *G06T 5/70* (2024.01); *G06T 7/90* (2017.01); *G06V 10/30* (2022.01);
(Continued)

(58) Field of Classification Search
CPC ........... G06T 7/00; G06T 7/0012; G06T 5/70; G06T 7/90; G06T 2207/20081;
(Continued)

(56) References Cited

U.S. PATENT DOCUMENTS

| | | | | |
|---|---|---|---|---|
| 2014/0137877 | A1* | 5/2014 | Deevi | .................... G01N 21/84 356/303 |
| 2016/0110630 | A1* | 4/2016 | Heusch | ................. G06T 7/0004 382/160 |
| 2017/0039627 | A1* | 2/2017 | Kalvin | ................. H04N 13/204 |

FOREIGN PATENT DOCUMENTS

| | | | | | |
|---|---|---|---|---|---|
| CN | 112529838 | A | * | 3/2021 | ........... G06F 18/214 |
| CN | 112818827 | A | * | 5/2021 | ....... G06F 18/23213 |

(Continued)

OTHER PUBLICATIONS

Setiawan W, Purnama A. Tobacco leaf images clustering using DarkNet19 and K-means. In2020 6th Information Technology International Seminar (ITIS) Oct. 14, 2020 (pp. 269-273). IEEE. (Year: 2020).*

*Primary Examiner* — Oneal R Mistry
*Assistant Examiner* — Duy Tran

(57)        ABSTRACT

A cigar tobacco leaf harvesting maturity identification method and system based on integrated learning are provided. The method comprises: acquiring an image of a cigar tobacco leaf to be detected, and preprocessing the image of the cigar tobacco leaf to be detected; carrying out vectorization dimensionality reduction on the preprocessed image of the cigar tobacco leaf to be detected, and extracting RGB and HSV eigenvalues to obtain a feature set; carrying out feature dimensionality reduction on data in the feature set by using a Wrapper algorithm to obtain an initial data set of the image of the cigar tobacco leaf to be detected; and inputting (Continued)

Cigar tobacco leaf acquisition step

Image preprocessing step

Vectorization dimensionality reduction step

Feature dimensionality reduction step

Model identification step the initial data set into a trained random forest model, and outputting a maturity identification result of the image of the cigar tobacco leaf.

10 Claims, 6 Drawing Sheets

(51) Int. Cl.

| | |
|---|---|
| *G06T 5/70* | (2024.01) |
| *G06T 7/90* | (2017.01) |
| *G06V 10/30* | (2022.01) |
| *G06V 10/762* | (2022.01) |
| *G06V 10/774* | (2022.01) |

(52) U.S. Cl.
CPC .......... *G06V 10/763* (2022.01); *G06V 10/774* (2022.01); *G06T 2207/20081* (2013.01); *G06T 2207/20182* (2013.01); *G06T 2207/30188* (2013.01)

(58) Field of Classification Search
CPC . G06T 2207/20082; G06T 2207/30188; G06T 2207/10024; G06T 5/73; G06T 5/90; G06V 10/30; G06V 10/762; G06V 10/763; G06V 10/774; G06V 10/76; G06V 10/75; G06V 10/7625; G06V 10/764; G06V 20/80; G06V 20/68; Y02P 90/30; G06F 18/214; G06F 18/22; G06F 18/23213; G06F 18/24323; G06F 18/243; G06N 20/00; G06N 20/20
See application file for complete search history.

(56) References Cited

FOREIGN PATENT DOCUMENTS

| | | | | | | |
|---|---|---|---|---|---|---|
| CN | 113222062 | A | * | 8/2021 | ......... | G06F 18/2415 |
| CN | 113989176 | A | * | 1/2022 | ............. | G06N 3/084 |
| CN | 114359697 | A | * | 4/2022 | ........... | G06F 18/241 |

* cited by examiner

Original image (176250 color eigenvalues)

Image after vectorization dimensionality reduction (10 color eigenvalues, clustering by K-Means algorithm)

The algorithm completes optimal feature selection

CIGAR TOBACCO LEAF HARVESTING MATURITY IDENTIFICATION METHOD AND SYSTEM BASED ON INTEGRATED LEARNING

CROSS-REFERENCE TO RELATED APPLICATIONS

This application claims priority to Chinese Application No. 202210800957.9, having a filing date of Jul. 8, 2022, the entire contents of which are hereby incorporated by reference.

FIELD

The present invention relates to the technical field of cigar tobacco leaf grading, in particular to a cigar tobacco leaf harvesting maturity identification method and system based on integrated learning.

BACKGROUND

The physical and physiological-biochemical characteristics of tobacco leaves grown in the field will change significantly in the process of development and maturation. Maturity means that tobacco leaves grow and develop in the field to a mature state suitable for curing and processing. The mature state of cigar tobacco leaves at harvest time directly determines the quality of tobacco leaves before air curing, and is closely related to the appearance quality, internal quality and sensory quality of tobacco leaves after air curing. Even for the same variety of tobacco leaves, the difference in maturity will affect the yellowing, color fixation and water loss characteristics of the tobacco leaves during air curing, thus affecting the quality of the tobacco leaves to a certain extent. Therefore, the precondition and basis for obtaining high-quality tobacco leaves is to accurately determine the maturity of tobacco leaves.

When tobacco farmers harvest cigar tobacco leaves, they often classify harvestable cigar tobacco leaves in different parts according to the appearance characteristics of the tobacco leaves into five grades: underripe, physiologically mature, moderately mature, technologically mature, fully mature, and postmature. There are obvious differences in the quality of tobacco leaves with different maturity grades after curing. For example, the chemical composition of underripe tobacco leaves is not coordinated after processing, the smoking quality is characterized by poor aroma quality, insufficient aroma, obvious irritation, slightly heavy green miscellaneous odor, potential quality characteristics are not fully manifested, and there is a lot of room for improvement in the intrinsic quality of tobacco leaves. After processing, technologically mature tobacco leaves have the highest quality, the most coordinated internal chemical components, and the best sensory and smoking quality. Therefore, harvesting tobacco leaves with good maturity, high grade, easy curing and processing, and good aroma and sufficient aroma can significantly increase the income of tobacco farmers.

However, in the air curing production of tobacco leaves, the tobacco leaves in different regions are quite different in climate, soil fertility, moisture, cultivation methods, etc., and are applicable to different standards on suitable maturity, and it is common for tobacco farmers to use green tobacco leaves for processing, thus adversely affecting the quality of processed tobacco leaves, In addition, since manual harvesting and visual identification of maturity are mostly adopted in the agricultural field at present, it is difficult to ensure the accuracy and efficiency and it is common to harvest the postmature leaves at the lower part, the underripe leaves at the middle part and the green leaves at the top. As a result, the quality of tobacco leaves decreases after air curing, which compromises the industrial applicability of tobacco leaves.

SUMMARY

In order to overcome the above shortcomings in the prior art, the present invention provides a cigar tobacco leaf harvesting maturity identification method and system based on integrated learning to solve at least one of the above technical problems.

According to an aspect of the present invention, provided is a cigar tobacco leaf harvesting maturity identification method based on integrated learning, including:

acquiring an image of a cigar tobacco leaf to be detected, and preprocessing the image of the cigar tobacco leaf to be detected;

carrying out vectorization dimensionality reduction on the preprocessed image of the cigar tobacco leaf to be detected, and extracting RGB and HSV eigenvalues to obtain a feature set;

carrying out feature dimensionality reduction on data in the feature set by using a Wrapper algorithm to obtain an initial data set of the image of the cigar tobacco leaf to be detected; and inputting the initial data set into a trained random forest model, and outputting a maturity identification result of the image of the cigar tobacco leaf.

According to the technical solution, vectorization dimensionality reduction is carried out on the image data of the cigar tobacco leaf without reducing the data sample size and the number of data features, thereby guaranteeing efficient extraction and utilization of image data information of the cigar tobacco leaf. Meanwhile, by means of the advantages of integrated learning in machine learning in learning widely from others' strong points, the texture and color of tobacco leaves acquired during the harvesting process of the cigar tobacco leaves serve as input features of a maturity grade identification model, and the problem that data values are damaged is solved. Based on the characteristic that feature selection and algorithm training of the Wrapper algorithm are performed at the same time, feature dimensionality reduction is carried out while feature selection is realized, thereby reducing the training cost of the model.

The above-mentioned technical solution utilizes the data acquired from the land field to achieve high-accuracy identification for the maturity grades of cigar tobacco leaves during the harvesting process, which can effectively alleviate the workload of tobacco farmers, improve the harvesting efficiency of cigar tobacco leaves and the quality of tobacco leaves cured in the air and increase the economic benefits of tobacco leaves.

As a further technical solution, before the step of inputting the initial data set into a trained random forest model and outputting a maturity identification result of the image of the cigar tobacco leaf, the method further includes:

acquiring a large number of cigar tobacco leaf image samples, and preprocessing the cigar tobacco leaf image samples;

carrying out vectorization dimensionality reduction on the preprocessed image of the cigar tobacco leaf to be detected, and extracting RGB and HSV eigenvalues to obtain a feature set; FIG. 1 is a schematic structural diagram of the present disclosure.

carrying out cigar tobacco leaf maturity grade coding on data in the feature set;

carrying out a nondimensionalizing operation on all sample data in the feature set and carrying out feature dimensionality reduction on all the sample data by using the Wrapper algorithm to obtain the initial data set of all the samples;

according to a Bagging integration method, modeling the initial data set with a random forest algorithm by using the initial data set as model input and cigar tobacco leaf maturity grade codes as model identification labels to build a random forest model;

dividing the feature set in the initial data set and the corresponding cigar tobacco leaf maturity grade codes into training set data and test set data according to a preset ratio; and inputting the training set data to train the built random forest model and obtain the trained random forest model.

The above technical solution takes the advantages of Bagging integrated learning to learn widely from others' strong points to build a random forest model, thereby improving the identification accuracy. Based on the fact that a decision tree model shows high-accuracy identification in cigar tobacco leaf image data, the technical solution adopts the decision tree model as a base evaluator to build a random forest model. The modeling results of base evaluators are considered and summarized to achieve a better identification performance than that of a single base evaluator and obtain a strong evaluator, thereby improving the accuracy of the maturity grade identification model for cigar tobacco leaves from the prospective of model building.

As a further technical solution, before the cigar tobacco leaf maturity grade coding or the nondimensionalizing operation, the data in the feature set is subjected to data cleaning, including missing value processing and outlier processing on the data in the feature set. Data quality can be improved through data cleaning, which is conducive to improving the final identification accuracy.

Specifically, the missing value processing is carried out by filling a missing value with a mean value of the feature set, and directly deleting data that lacks a large number of valid eigenvalues in the feature set.

Specifically, the outlier processing is carried out by identifying outliers by using a box plot method and then correcting the outliers by using functional relationships of data before and after the data cleaning.

As a further technical solution, preprocessing the image of the cigar tobacco leaf includes: denoising the image of the cigar tobacco leaf by using a non-local average denoising algorithm; then dehazing the denoised image of the cigar tobacco leaf by using a dark channel dehazing algorithm; and finally carrying out color correction on the dehazed image of the cigar tobacco leaf by using an image color correction algorithm.

According to the above technical solution, the acquired image is preprocessed by the non-local average denoising algorithm, the dark channel dehazing algorithm and the image color correction algorithm to improve image quality.

Furthermore, the image of the cigar tobacco leaf is denoised by using the non-local average denoising algorithm and the detail features of the image are retained. Specifically, for the whole image, similar blocks in the image are searched in units of pixels, weighted average calculation is then carried out, and a median gray value of all pixels in the blocks is used as a pixel value of a pixel to be processed.

Further, the image of the cigar tobacco leaf is dehazed by using the dark channel dehazing algorithm to alleviate the tendency of pixels in the image to transition to white, thereby obtaining a high-quality depth image. R, G; and B three-channel values of the pixels in the image are compared, and the channel with a minimum channel value ("dark" channel) among the three channels of each pixel are combined in a fixed form to form a dark channel image of the cigar tobacco leaf.

Further, the color correction is carried out on the image of the cigar tobacco leaf by using the image color correction algorithm, and the influence of a collection environment on the image is shielded. In combination with a support vector regression method, color deviation in the image is corrected to solve the problem of color difference in a spliced image caused by time, light and other factors during the splicing of color images, and restore the color of the image.

As a further technical solution, the carrying out vectorization dimensionality reduction on the preprocessed image of the cigar tobacco leaf to be detected further includes:

extracting color eigenvalues of tens of thousands of pixels in the image of the cigar tobacco leaf to obtain a matrix having data as [image length, image width, color eigenvalue channel number], and vectorizing the data into a matrix [image length*image width, color eigenvalue channel number] to obtain image data before clustering;

importing the image data before clustering into a K-Means algorithm, selecting the number of clusters to be R, and carrying out clustering to obtain R clusters of color eigenvalues in the image data; and replacing color eigenvalues of all pixels under the current cluster with color eigenvalues of pixels of R clusters at centroids.

According to the above technical solution, the channel values of tens of thousands of pixels in each image are clustered by using the K-Means clustering algorithm without changing the number of features and samples of the data, and the channel values of all pixels under a class are replaced with the channel values of the pixels of the cluster at the centroid, thereby simplifying the image structure of the cigar tobacco leaf, ensuring the efficient extraction and utilization of image data information of the cigar tobacco leaf, and solving the problem of damage to the data value.

As a further technical solution, the method further includes:

building a plurality of independent base estimators by using the decision tree model as a base estimator, and integrating the plurality of base estimators according to a Bagging principle to obtain the random forest model; and determining identification results of the random forest model through an average or majority voting principle according to identification results of the plurality of base estimators to obtain a strong estimator for identifying the maturity grade of cigar tobacco leaf.

The above technical solution takes the advantages of Bagging integrated learning to learn widely from others' strong points to build a random forest model and determines the identification results of the random forest model through the average or majority voting principle according to the identification results of the plurality of base estimators, thereby improving the maturity grade identification accuracy of cigar tobacco leaves.

According to an aspect of the present invention, provided is a cigar tobacco leaf harvesting maturity identification system based on integrated learning, including:

an acquisition module configured to acquire an image of a cigar tobacco leaf;

a preprocessing module configured to preprocess the image of the cigar tobacco leaf;

a vectorization dimensionality reduction module configured to carry out vectorization dimensionality reduction on the preprocessed image of the cigar tobacco leaf and extract RGB and HSV eigenvalues to obtain a feature set;

a feature dimensionality reduction module configured to carry out a nondimensionalizing operation on data in the feature set and carry out feature dimensionality reduction on the data in the feature set by using a Wrapper algorithm to obtain an initial data set of the image of the cigar tobacco leaf to be detected; and a model identification module configured to input the initial data set into a trained random forest model and output a maturity identification result of the image of the cigar tobacco leaf.

According to the above technical solution, the image of the cigar tobacco leaf is acquired and uploaded through the acquisition module, the image is preprocessed through the preprocessing module, and vectorization dimensionality reduction are carried out on the preprocessed image and extraction of eigenvalues through the vectorization dimensionality reduction module to obtain a feature set, thereby guaranteeing efficient extraction and utilization of image data information of the cigar tobacco leaf without damaging the data value. Moreover, the feature dimensionality reduction module is also configured to implement feature selection and feature dimensionality reduction at the same time to obtain the initial data set. This module eliminates the features in the sample data that are not conducive to model training, reduces the training cost of the model, and improves the training efficiency of the model. Finally, the obtained initial data set is input into the trained random forest model to obtain the maturity identification result of the cigar tobacco leaf, thus achieving the efficient and high-accuracy identification in the harvesting process of cigar tobacco leaves.

As a further technical solution, the system further includes a data cleaning module configured to, before executing the feature dimensionality reduction module, carry out data cleaning, including missing value processing and outlier processing, on the data in the feature set. Data quality can be improved through data cleaning, which is conducive to improving the final identification accuracy.

As a further technical solution, the system further includes: a random forest model building module configured to, according to a Bagging integration method, model the initial data set with a random forest algorithm by using the initial data set as model input and cigar tobacco leaf maturity grade codes as model identification labels to build a random forest model; and a random forest model training module configured to divide the feature set in the initial data set and the corresponding cigar tobacco leaf maturity grade codes into training set data and test set data according to a preset ratio and input the training set data to train the built random forest model and obtain the trained random forest model.

As a further technical solution, the system further includes a grade coding module configured to, after the data cleaning or the vectorization dimensionality reduction, digitally code maturity grades of cigar tobacco leaves and store the digital codes in a database.

As a further technical solution, the vectorization dimensionality reduction module further includes:

a data extraction module configured to extract color eigenvalues of tens of thousands of pixels in the image of the cigar tobacco leaf to obtain a matrix having data as [image length, image width, color eigenvalue channel number] and vectorize the data into a matrix [image length*image width, color eigenvalue channel number] to obtain image data before clustering, a clustering module configured to import the image data before clustering into a K-Means algorithm, select the number of clusters to be R, and carry out clustering to obtain R clusters of color eigenvalues in the image data;

a dimensionality reduction module configured to replace color eigenvalues of all pixels under the current cluster with color eigenvalues of pixels of R clusters at centroids; and an eigenvalue extraction module configured to extract RGB and HSV eigenvalues based on the dimensionally reduced data to obtain a feature set.

The above technical solution efficiently utilizes the image data information while simplifying the processing of the image structure. Vectorization dimensionality reduction is carried out on the cigar tobacco leaf image data by using the K-Means clustering algorithm without reducing the data sample size and the number of data features, thereby guaranteeing efficient extraction and utilization of image data information of the cigar tobacco leaf, solving the problem of damage to the data value, and improving the accuracy of the maturity grade identification model for cigar tobacco leaves from the prospective of data.

As a further technical solution, the preprocessing module further includes:

a denoising module configured to denoise the image of the cigar tobacco leaf by using a non-local average denoising algorithm;

a dehazing module configured to dehaze the denoised image of the cigar tobacco leaf by using a dark channel dehazing algorithm; and a correcting module configured to carry out color correction on the dehazed image of the cigar tobacco leaf by using an image color correction algorithm.

Compared with the prior art, the present invention has the following beneficial effects:

(1) According to the present invention, vectorization dimensionality reduction is carried out on the image data of the cigar tobacco leaf without reducing the data sample size and the number of data features, thereby guaranteeing efficient extraction and utilization of image data information of the cigar tobacco leaf. Meanwhile, by means of the advantages of integrated learning in machine learning in learning widely from others' strong points, the texture and color of tobacco leaves acquired during the harvesting process of the cigar tobacco leaves serve as input features of a maturity grade identification model, and the problem that data values are damaged is solved. Based on the characteristic that feature selection and algorithm training of the Wrapper algorithm are performed at the same time, feature dimensionality reduction is carried out while feature selection is realized, thereby reducing the training cost of the model.

(2) The present invention utilizes the data acquired from the land field to achieve high-accuracy identification for the maturity grades of cigar tobacco leaves during the harvesting process, which can effectively reduce the workload of tobacco farmers, improve the harvesting efficiency of cigar tobacco leaves and the quality of tobacco leaves cured in the air and increase the economic benefits of tobacco leaves.

(3) Based on the fact that a decision tree model shows high-accuracy identification in cigar tobacco leaf image data, the present invention adopts the decision tree model as a base evaluator to build a random forest model. The modeling results of evaluators are considered and summarized to achieve a better identification performance than that of a single evaluator and obtain a strong evaluator, thereby improving the accuracy of the maturity grade identification model for cigar tobacco leaves from the prospective of model building.

DETAILED DESCRIPTION

The technical solutions in the embodiments of the invention will be described clearly and completely below in connection with the accompanying drawings, and it will be apparent that the embodiments described herein are merely part of, not all the embodiments of the invention. All other embodiments obtained by a person of ordinary skill in the art based on the embodiments of the invention without creative efforts shall fall within the scope of the invention.

First Embodiment

Figure 1:
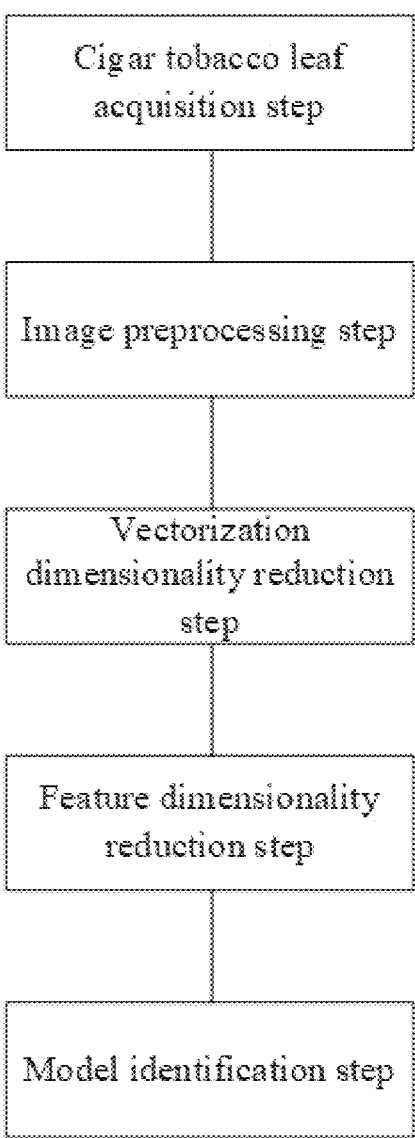
FIG. 1 is a flowchart of a cigar tobacco leaf harvesting maturity identification method based on integrated learning according to an embodiment of the present invention.

The present invention provides a cigar tobacco leaf harvesting maturity identification method based on integrated learning, which is mainly applied to field harvesting of cigar tobacco leaves. Referring to FIG. 1, the method includes: a step of cigar tobacco leaf acquisition; a step of image preprocessing; a step of vectorization dimensionality reduction; a step of feature dimensionality reduction; and a step of model identification.

The solution is specifically implemented as follows:

S1: the step of cigar tobacco leaf acquisition: acquiring image data of a cigar tobacco leaf during a harvesting process and uploading the image data to a cloud platform database through a transmission device to form an original data set for model training.

S2: the step of image preprocessing: preprocessing the acquired image of the cigar tobacco leaf by using a non-local average denoising algorithm, a dark channel dehazing algorithm and an image color correction algorithm to improve image quality.

The step of preprocessing the image of the cigar tobacco leaf includes:

S21: denoising the image of the cigar tobacco leaf by using the non-local average denoising algorithm. Specifically, for the whole image, similar blocks in the image are searched in units of N*N pixel blocks and a median gray value of all pixels in the blocks is used as a pixel value of a pixel to be processed. For example, to search similar blocks in an image in units of N*N pixel blocks, the parameter settings can be selected as follows: N is 3, the size of a search window is 21*21, the pixel block is 7*7, and the smoothing factor is 5.

S22: dehazing the image of the tobacco leaf by using the dark channel dehazing algorithm to alleviate the tendency of pixels in the image to transition to white, thereby obtaining a high-quality depth image. R, G and B three-channel values of the pixels in the image are compared, and the channel with a minimum channel value ("dark" channel) among the three channels of each pixel are combined in a fixed form to form a dark channel image of the tobacco leaf.

S23: carrying out color correction on the image of the tobacco leaf by using the image color correction algorithm, and shielding the influence of a collection environment on the image. In combination with a support vector regression method, color deviation in the image is corrected to solve the problem of color difference in a spliced image caused by time, light and other factors during the splicing of color images, and restore the color of the image.

S3: the step of vectorization dimensionality reduction: acquiring the preprocessed image of the cigar tobacco leaf processed in step S2, first carrying out vectorization dimensionality reduction by using a K-Means clustering algorithm to simplify the structure of the image of the tobacco leaf without changing the sample size, and then extracting RGB and HSV eigenvalues of the image of the cigar tobacco leaf, and converting unstructured data into structured data to obtain feature set.

The step of vectorization dimensionality reduction of the image specifically includes the following steps:

S31: extracting color eigenvalues of tens of thousands of pixels in the image of the cigar tobacco leaf to obtain a matrix having data as [image length, image width, color eigenvalue channel number], and vectorizing the data into a matrix [image length*image width, color eigenvalue channel number] to obtain image data before clustering.

S2: clustering the color eigenvalues of the image into 20 clusters by using the K-Means clustering algorithm. The image data processed in S31 is imported into the K-Means algorithm, the number of clusters is selected to be 20, and then clustering is carried out to obtain 20 most important clusters of color eigenvalue information in the image data.

Figure 4:
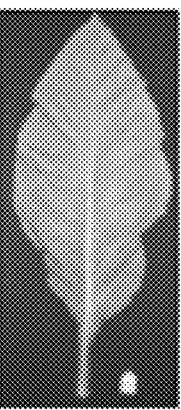
FIG. 4 is a schematic diagram of comparison between images before and after vectorization dimensionality reduction.
Figure 4:
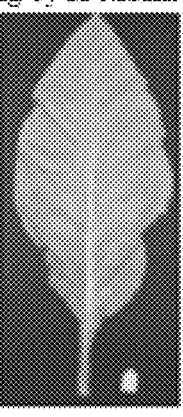

S33: replacing color eigenvalues of all pixels under the cluster with color eigenvalues of pixels of 20 clusters at centroids. Since the color eigenvalues of tens of thousands of pixels in the image are very similar to the color eigenvalues of the pixels at their centroids, the color eigenvalues of the pixels at the centroids are replaced by the color eigenvalues of all pixels under this cluster. In this way, the number of image samples is not changed and the number of data features is not reduced, thereby retaining the image information and simplifying the image structure of the tobacco leaf. FIG. 4 shows comparison between images before and after K-Means vectorization dimensionality reduction.

S34: building the feature set by:

extracting the eigenvalues of six color components, i.e., R (red), G (green), B (blue), H (hue), S (saturation), V (brightness), of the image processed in step S33, reducing the impact of brightness through normalization processing, and uploading the data to the database through a network, thus obtaining the feature set.

Figure 2:
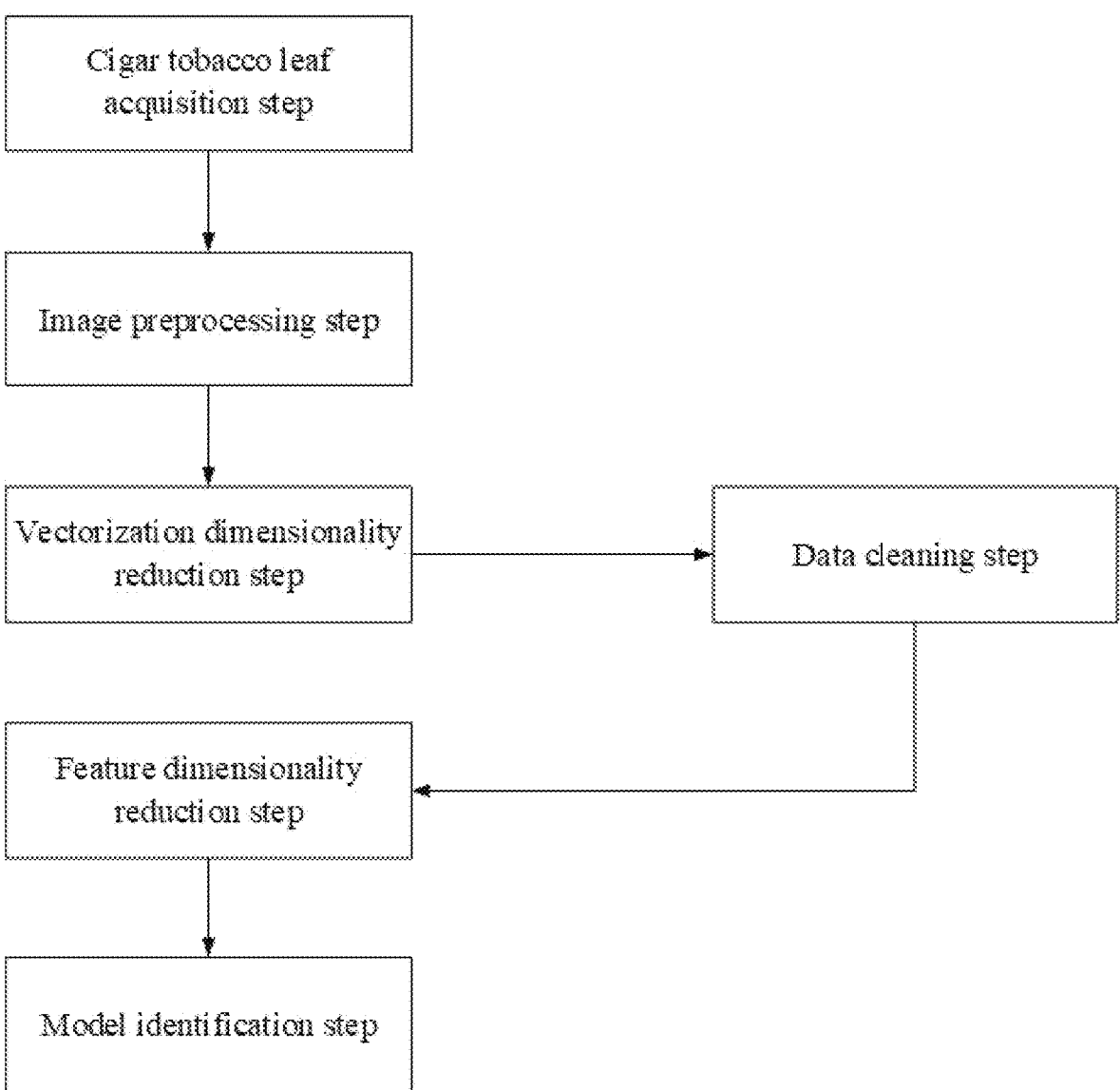
FIG. 2 is a flowchart of a cigar tobacco leaf harvesting maturity identification method based on integrated learning according to another embodiment of the present invention.

Optionally, in order to improve data quality, a data cleaning step may be carried out before the step of feature dimensionality reduction, as shown in FIG. 2. That is, the data in the feature set in step S34 is subjected to missing value processing and outlier processing to improve the quality of the data, and then feature dimensionality reduction is carried out.

The data cleaning step is specifically carried out as follows:

(1) Missing value processing: filling a missing value with a mean value of the feature set, and directly deleting data that lacks a large number of valid eigenvalues in the feature set.

(2) Outlier processing: identifying outliers by using a box plot method and then correcting the outliers by using functional relationships of data before and after the data cleaning.

S4. Feature dimensionality reduction: carrying out a non-dimensionalizing operation on all sample data in the feature set and carrying out feature dimensionality reduction on all the sample data processed in step S3 by using the Wrapper algorithm to obtain the initial data set.

Specific steps are as follows.

S41: nondimensionalizing of data.

The cleaned harvesting data is centered according to the minimum value, and then scaled according to the range, so that all the data is moved by the minimum value unit, and converges to [0,1]. In this way, the nondimensionalizing operation of converting the data of different specifications to the same specification and converting data from different distributions to a specific distribution is completed, thereby improving the accuracy of the model and avoiding the impact of a feature with a particularly large value range on distance calculation.

S42: feature selection of data.

Figure 5:
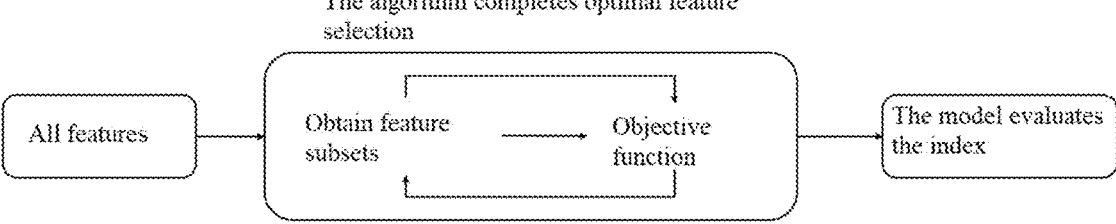
FIG. 5 is a schematic diagram of feature dimensionality reduction and selection according to an embodiment of the present invention.

Based on the characteristic that feature selection and algorithm training of the Wrapper algorithm are performed at the same time, feature selection is realized according to the learning needs of the identification model itself. As shown in FIG. 5, the least important features are pruned from the current set of features, and the process is repeated recursively on the pruned set of features until finally reaching the required number of feature subsets to be selected. Model performance is improved in combination with the needs of the model.

The objective function in FIG. 5 uses the most classic greedy optimization algorithm: recursive feature elimination method (RFE). According to RFE, a model is repeatedly created, and in each iteration, optimal features are retained or worst features are removed, and in the next iteration, features that are not selected in the previous modeling will be used to build the next model until all features are exhausted. The features are then ranked according to the order in which they are retained or removed, and finally an optimal subset is selected.

S5: the step of model identification step: inputting the initial data set obtained feature dimensionality reduction processing into a trained random forest model, and outputting a maturity identification result of the image of the cigar tobacco leaf.

Before model identification, cigar tobacco leaf maturity grade coding can also be carried out on the data after vectorization dimensionality reduction or data cleaning. The maturity grades of cigar tobacco leaves are divided into: underripe, physiologically mature, moderately mature, technologically mature, fully mature, and postmature. The processed data is denoted according to the state, corresponding to the numbers 0, 1, 2, 3, and 4, respectively, and the grades are saved as training labels to the cigar tobacco leaf harvesting database.

Figure 3:
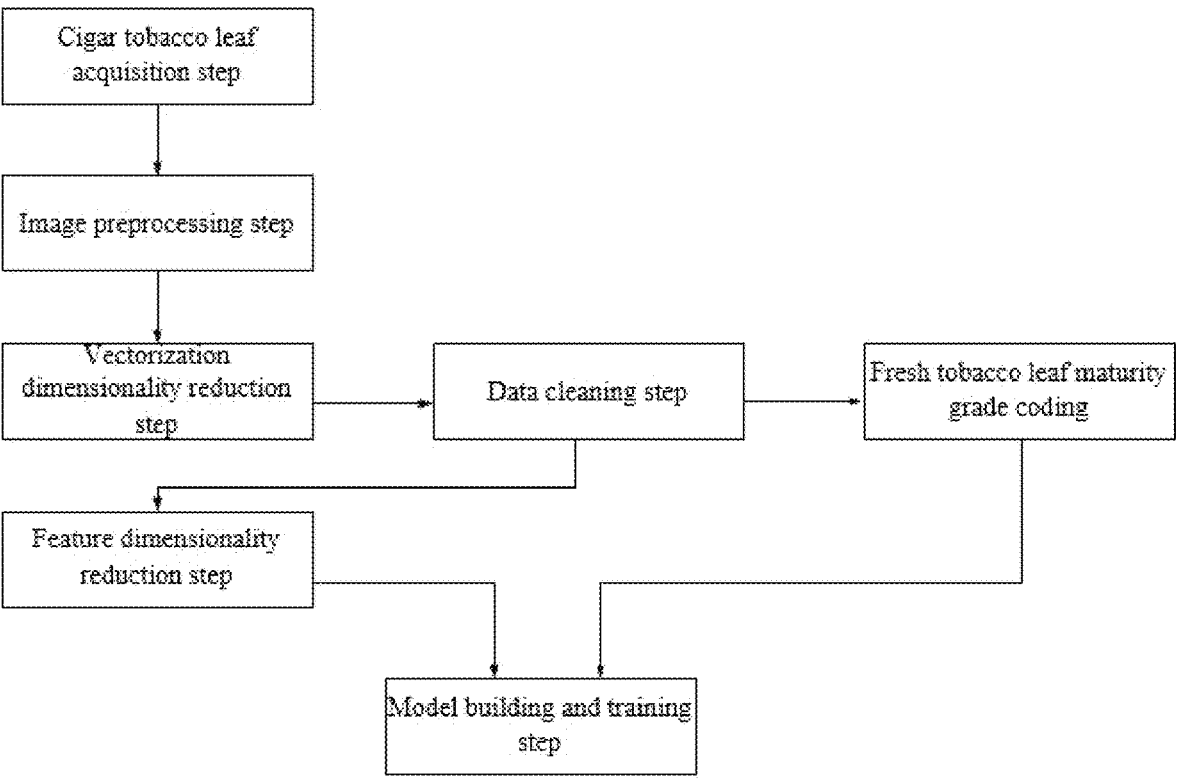
FIG. 3 is a flowchart of model building and training according to another embodiment of the present invention.

Before model identification, the method further includes the step of model building and training, as shown in FIG. 3, which is specifically implemented by: according to a Bagging integration method, modeling the feature set with a random forest algorithm by using the feature set as feature data of model input and cigar tobacco leaf maturity grade codes as model identification labels and carrying out training with a training data set to build a trained random forest model.

Figure 6:
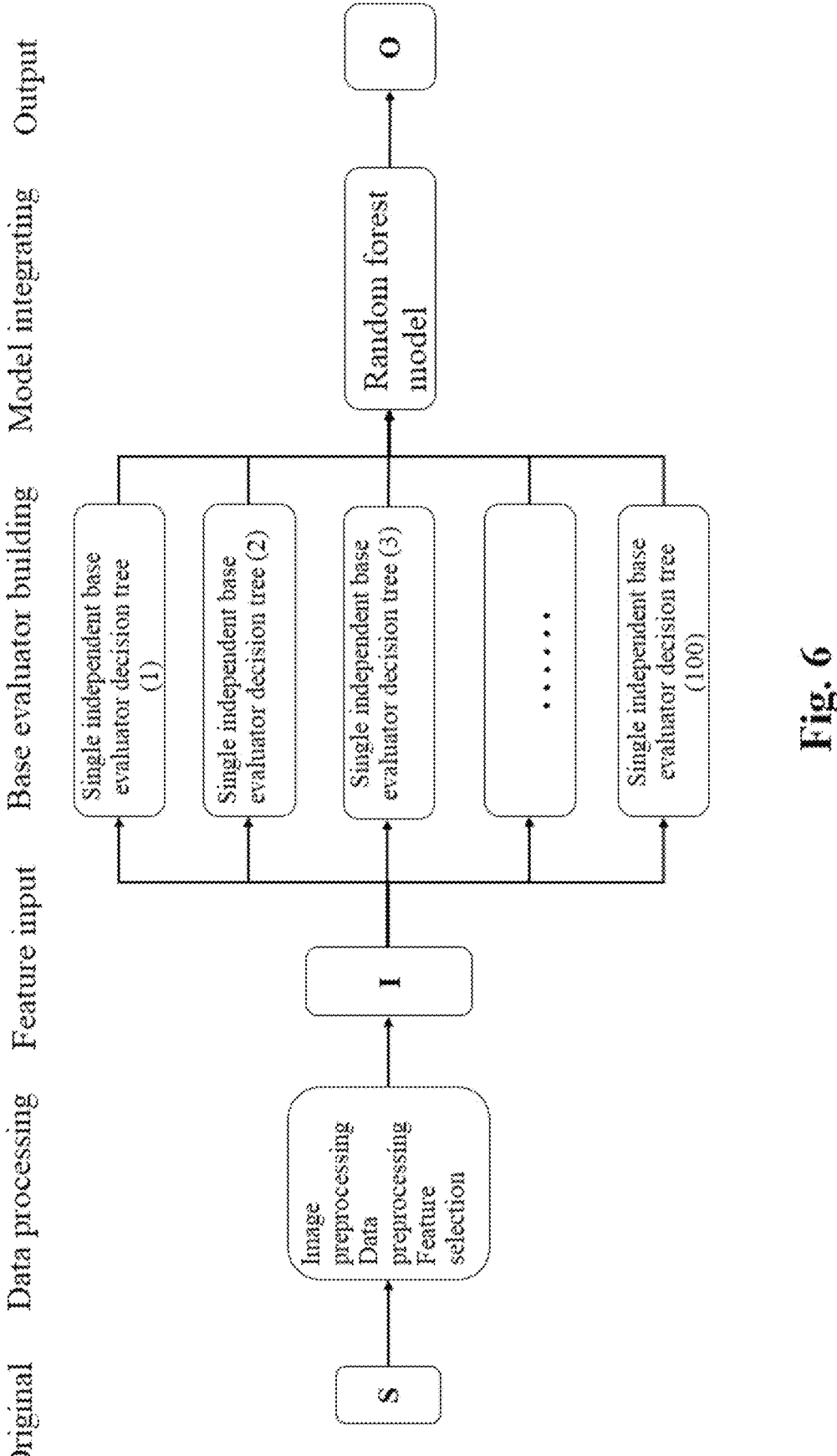
FIG. 6 is a flowchart of random forest model training according to an embodiment of the present invention.

As shown in FIG. 6, specific steps are as follows:

S51: dividing a training set and a test set.

The feature subsets after selection in step S4 and the corresponding cigar tobacco leaf maturity grade digital codes are divided into training set data and test set data according to a ratio of 7:3.

S52: building a decision tree base estimator.

The base evaluator is built by using a decision tree algorithm. For a classification model, the impurity indexes of all features are calculated first and the feature with the optimal impurity index is selected to be branched. After branching, under the different values of the branched feature, the impurity of each feature is then calculated. The feature with the lowest impurity is further selected for the next layer of branching. With each layer of branching, the overall impurity of the tree will become lower and lower. The decision tree pursues the minimum impurity, so the decision tree will keep branching until no more features are available. Or the overall impurity index is optimal, the decision tree stops growing, and the building of a single base evaluator is completed.

S53: integrating the random forest model according to the bagging method.

The random forest model is integrated according to the Bagging method. The identification results of a plurality of independent base evaluators are integrated according to the principle of minority obeying the majority to obtain a final identification result. Therefore, the higher the identification accuracy of a single decision tree base evaluator, the higher the identification accuracy of the finally integrated random forest identification model.

For example, the number of base evaluators is selected as 100. For any sample, based on the average or majority voting principle, if and only when more than 50 trees in the random forest model make an error, the random forest will make an error. The identification accuracy rate of a single decision tree for the maturity grade of cigar tobacco leaves fluctuates around 0.90. Assuming that the error probability of one tree is 0.1($\varepsilon$), the error probability of more than 50 trees is calculated as follows:

$$e_{\text{random\_forest}} = \sum_{i=51}^{100} C_{100}^i \varepsilon^i (1-\varepsilon)^{100-i} = 6.323 \times 10^{-25}$$

where, i represents the number of errors and also the number of trees that make an error, ε represents the error probability of one tree and (1−ε) represents the correct probability, totaling 100-i correct determinations. Because among the 100 trees, any i trees make an error, a combination is used for calculation.

The training set data is input to train the integrated random forest model. The parameters of the integrated model are adjusted automatically according to a grid search method. It is determined according to a learning curve that the number of decision tree models in the integrated model is 100, the impurity index is gini (Gini coefficient), the maximum depth of a tree is 8, the minimum sample size required for an intermediate node to branch is 13, the minimum sample size required for an intermediate node to exist is 1, and the maximum number of leaf nodes is 12 and then the training for the random forest identification model in Bagging integrated learning can be completed.

S54: identifying and outputting the test set data by using the random forest model obtained in step S53 with a correct rate of 98% or above. This shows that the feature data extracted during the harvesting process of cigar tobacco leaves are imported into the random forest model of the present invention to identify the maturity grades of cigar tobacco leaves, so as to solve the problem of damage to data values, and efficiently use the data acquired from the land field to achieve high-accuracy identification for the maturity grades of cigar tobacco leaves in the harvesting process.

Second Embodiment

Figure 7:
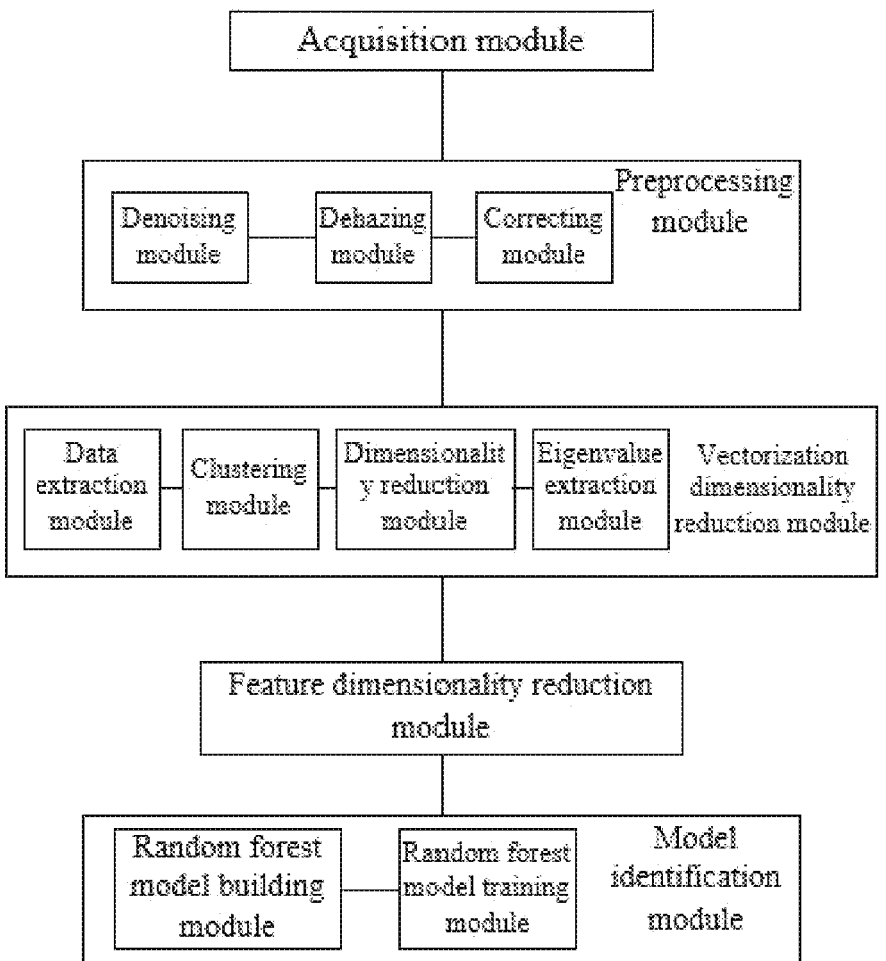
FIG. 7 is a schematic diagram of a cigar leaf harvesting maturity identification system based on integrated learning of the present invention.

According to an aspect of the description of the present invention, provided is a cigar tobacco leaf harvesting maturity identification system based on integrated learning, referring to FIG. 7, including: an acquisition module configured to acquire an image of a cigar tobacco leaf, a preprocessing module configured to preprocess the image of the cigar tobacco leaf, a vectorization dimensionality reduction module configured to carry out vectorization dimensionality reduction on the preprocessed image of the cigar tobacco leaf and extract RGB and HSV eigenvalues to obtain a feature set; a feature dimensionality reduction module configured to carry out a nondimensionalizing operation on data in the feature set and carry out feature dimensionality reduction on the data in the feature set by using a Wrapper algorithm to obtain an initial data set of the image of the cigar tobacco leaf to be detected; and a model identification module configured to input the initial data set into a trained random forest model, and output a maturity identification result of the image of the cigar tobacco leaf.

As a further technical solution, the system further includes a data cleaning module configured to, before executing the feature dimensionality reduction module, carry out data cleaning, including missing value processing and outlier processing, on the data in the feature set. Data quality can be improved through data cleaning, which is conducive to improving the final identification accuracy.

As a further technical solution, the system further includes a grade coding module configured to, after the data cleaning or the vectorization dimensionality reduction, digitally code maturity grades of cigar tobacco leaves and store the digital codes in a database.

The system further includes a random forest model building module and a random forest model training module configured to build and train a random forest model prior to model identification.

The random forest model building module is specifically configured to, according to a Bagging integration method, model the initial data set with a random forest algorithm by using the initial data set as model input and cigar tobacco leaf maturity grade codes as model identification labels to build a random forest model; and a random forest model training module is configured to divide the feature set in the initial data set and the corresponding cigar tobacco leaf maturity grade codes into training set data and test set data according to a preset ratio and input the training set data to train the built random forest model and obtain the trained random forest model.

Preferably, the vectorization dimensionality reduction module further includes: a data extraction module configured to extract color eigenvalues of tens of thousands of pixels in the image of the cigar tobacco leaf to obtain a matrix having data as [image length, image width, color eigenvalue channel number] and vectorize the data into a matrix [image length*image width, color eigenvalue channel number] to obtain image data before clustering, a clustering module configured to import the image data before clustering into a K-Means algorithm, select the number of clusters to be R, and carry out clustering to obtain R clusters of color eigenvalues in the image data; a dimensionality reduction module configured to replace color eigenvalues of all pixels under the current cluster with color eigenvalues of pixels of R clusters at centroids; and an eigenvalue extraction module configured to extract RGB and HSV eigenvalues based on the dimensionally reduced data to obtain a feature set.

The above preferred technical solution efficiently utilizes the image data information while simplifying the processing of the image structure. Vectorization dimensionality reduction is carried out on the cigar tobacco leaf image data by using the K-Means clustering algorithm without reducing the data sample size and the number of data features, thereby guaranteeing efficient extraction and utilization of image data information of the cigar tobacco leaf, solving the problem of damage to the data value, and improving the accuracy of the maturity grade identification model for cigar tobacco leaves from the prospective of data.

As a further technical solution, the preprocessing module further includes: a denoising module configured to denoise the cigar tobacco leaf image by using a non-local average denoising algorithm; a dehazing module configured to dehaze the denoised cigar tobacco leaf image by using a dark channel dehazing algorithm; and a correcting module configured to carry out color correction on the dehazed cigar tobacco leaf image by using an image color correction algorithm.

The cigar tobacco leaf image is denoised by using the non-local average denoising algorithm and the detail features of the image are retained. Specifically, for the whole image, similar blocks in the image are searched in units of pixels, weighted average calculation is then carried out, and a median gray value of all pixels in the blocks is used as a pixel value of a pixel to be processed.

The cigar tobacco leaf image is dehazed by using the dark channel dehazing algorithm to alleviate the tendency of pixels in the image to transition to white, thereby obtaining a high-quality depth image. R, G, and B three-channel values of the pixels in the image are compared, and the channel with a minimum channel value ("dark" channel) among the three channels of each pixel are combined in a fixed form to form a dark channel image of the cigar tobacco leaf.

The color correction is carried out on the image of the cigar tobacco leaf by using the image color correction algorithm, and the influence of a collection environment on the image is shielded. In combination with a support vector regression method, color deviation in the image is corrected to solve the problem of color difference in a spliced image caused by time, light and other factors during the splicing of color images, and restore the color of the image.

The acquired image is preprocessed by the non-local average denoising algorithm, the dark channel dehazing algorithm and the image color correction algorithm to improve image quality. The system can be designed to be realized by computer or software, so as to perform all the functions of the above modules and algorithms.

As described herein, the description with reference to the terms "an embodiment", "some embodiments", "exemplary embodiment", "example", "specific example", "some examples" or the like means specific features, structures, materials or characteristics described in connection with the embodiment or example are included in at least one embodiment or example of the invention. In the description, the schematic representations of the above terms do not necessarily refer to the same embodiment or example. Moreover, the specific features, structures, materials, or characteristics described may be combined in a suitable manner in any one or more embodiments or examples.

Finally, it should be noted that the above embodiments are only used for illustrating rather than limiting the technical solutions of the invention. Although the invention is described in detail with reference to the foregoing embodiments, those of ordinary skill in the art should understand that they still can make modifications to the technical solutions disclosed in the foregoing embodiments or make equivalent substitutions to some or all of technical features thereof. Such modifications or substitutions should not cause the essence of the corresponding technical solutions to depart from the scope of the technical solutions of the embodiments of the invention.

What is claimed is:

1. A cigar leaf harvesting maturity identification method based on integrated learning, comprising:

during a harvesting process in a field of cigar tobacco leaves, acquiring an image of a cigar tobacco leaf to be detected, and preprocessing the image of the cigar tobacco leaf to be detected;

carrying out vectorization dimensionality reduction on the preprocessed image of the cigar tobacco leaf to be detected, and extracting RGB and HSV eigenvalues to obtain a feature set;

carrying out feature dimensionality reduction on data in the feature set by using a Wrapper algorithm to obtain an initial data set of the image of the cigar tobacco leaf to be detected; and inputting the initial data set into a trained random forest model, and outputting a maturity identification result of the image of the cigar tobacco leaf;

wherein carrying out vectorization dimensionality reduction on the preprocessed image of the cigar tobacco leaf to be detected further comprises:

extracting color eigenvalues of tens of thousands of pixels in the image of the cigar tobacco leaf to obtain a matrix having data as [image length, image width, color eigenvalue channel number], and vectorizing the data into a matrix [image length*image width, color eigenvalue channel number] to obtain image data before clustering:

importing the image data before clustering into a K-Means algorithm, selecting the number of clusters to be R, and carrying out clustering to obtain R clusters of color eigenvalues in the image data; and replacing color eigenvalues of all pixels under the current cluster with color eigenvalues of pixels of R clusters at centroids.

2. The cigar leaf harvesting maturity identification method based on integrated learning according to claim 1, wherein before the step of inputting the initial data set into a trained random forest model and outputting a maturity identification result of the image of the cigar tobacco leaf, the method further comprises:

acquiring a large number of cigar tobacco leaf image samples, and preprocessing the cigar tobacco leaf image samples;

carrying out vectorization dimensionality reduction on the preprocessed image of the cigar tobacco leaf to be detected, and extracting RGB and HSV eigenvalues to obtain a feature set;

carrying out cigar tobacco leaf maturity grade coding on data in the feature set;

carrying out a nondimensionalizing operation on all sample data in the feature set and carrying out feature dimensionality reduction on all the sample data by using the Wrapper algorithm to obtain the initial data set of all the samples;

according to a Bagging integration method, modeling the initial data set with a random forest algorithm by using the initial data set as model input and cigar tobacco leaf maturity grade codes as model identification labels to build a random forest model;

dividing the feature set in the initial data set and the corresponding cigar tobacco leaf maturity grade codes into training set data and test set data according to a preset ratio; and inputting the training set data to train the built random forest model and obtain the trained random forest model.

3. The cigar leaf harvesting maturity identification method based on integrated learning according to claim 1, wherein before the cigar tobacco leaf maturity grade coding or the nondimensionalizing operation, the data in the feature set is subjected to data cleaning, including missing value processing and outlier processing on the data in the feature set.

4. The cigar leaf harvesting maturity identification method based on integrated learning according to claim 2, wherein before the cigar tobacco leaf maturity grade coding or the nondimensionalizing operation, the data in the feature set is subjected to data cleaning, including missing value processing and outlier processing on the data in the feature set.

5. The cigar leaf harvesting maturity identification method based on integrated learning according to claim 1, wherein preprocessing the image of the cigar tobacco leaf comprises: denoising the image of the cigar tobacco leaf by using a non-local average denoising algorithm; then, dehazing the denoised image of the cigar tobacco leaf by using a dark channel dehazing algorithm; and finally carrying out color correction on the dehazed image of the cigar tobacco leaf by using an image color correction algorithm.

6. The cigar leaf harvesting maturity identification method based on integrated learning according to claim 2, further comprising:

building a plurality of independent base estimators by using a decision tree model as a base estimator, and integrating the plurality of base estimators according to a Bagging principle to obtain the random forest model; and determining identification results of the random forest model through an average or majority voting principle according to identification results of the plurality of base estimators to obtain a strong estimator for identifying the maturity grade of cigar tobacco leaf.

7. A cigar leaf harvesting maturity identification system based on integrated learning, comprising:

an acquisition module configured to acquire an image of a cigar tobacco leaf during a harvesting process in a field of cigar tobacco leaves;

a preprocessing module configured to preprocess the image of the cigar tobacco leaf;

a vectorization dimensionality reduction module configured to carry out vectorization dimensionality reduction on the preprocessed image of the cigar tobacco leaf and extract RGB and HSV eigenvalues to obtain a feature set;

a feature dimensionality reduction module configured to carry out a nondimensionalizing operation on data in the feature set and carry out feature dimensionality reduction on the data in the feature set by using a Wrapper algorithm to obtain an initial data set of the image of the cigar tobacco leaf to be detected; and a model identification module configured to input the initial data set into a trained random forest model and output a maturity identification result of the image of the cigar tobacco leaf;

wherein the feature dimensionality reduction module is configured to extract color eigenvalues of tens of thousands of pixels in the image of the cigar tobacco leaf to obtain a matrix having data as [image length, image width, color eigenvalue channel number], and vectorize the data into a matrix [image length*image width, color eigenvalue channel number] to obtain image data before clustering;

import the image data before clustering into a K-Means algorithm, select the number of clusters to be R, and carry out clustering to obtain R clusters of color eigenvalues in the image data; and replace color eigenvalues of all pixels under the current cluster with color eigenvalues of pixels of R clusters at centroids.

8. The cigar leaf harvesting maturity identification system based on integrated learning according to claim 7, further comprising:

a random forest model building module configured to, according to a Bagging integration method, model the initial data set with a random forest algorithm by using the initial data set as model input and cigar tobacco leaf maturity grade codes as model identification labels to build a random forest model; and a random forest model training module configured to divide the feature set in the initial data set and the corresponding cigar tobacco leaf maturity grade codes into training set data and test set data according to a preset ratio and input the training set data to train the built random forest model and obtain the trained random forest model.

9. The cigar leaf harvesting maturity identification system based on integrated learning according to claim 7, wherein the vectorization dimensionality reduction module further comprises:

a data extraction module configured to extract color eigenvalues of tens of thousands of pixels in the image of the cigar tobacco leaf to obtain a matrix having data as [image length, image width, color eigenvalue channel number] and vectorize the data into a matrix [image length*image width, color eigenvalue channel number] to obtain image data before clustering;

a clustering module configured to import the image data before clustering into a K-Means algorithm, select the number of clusters to be R, and carry out clustering to obtain R clusters of color eigenvalues in the image data;

a dimensionality reduction module configured to replace color eigenvalues of all pixels under the current cluster with color eigenvalues of pixels of R clusters at centroids; and an eigenvalue extraction module configured to extract RGB and HSV eigenvalues based on the dimensionally reduced data to obtain a feature set.

10. The cigar leaf harvesting maturity identification system based on integrated learning according to claim 8, wherein the preprocessing module further comprises:

a denoising module configured to denoise the image of the cigar tobacco leaf by using a non-local average denoising algorithm;

a dehazing module configured to dehaze the denoised image of the cigar tobacco leaf by using a dark channel dehazing algorithm; and a correcting module configured to carry out color correction on the dehazed image of the cigar tobacco leaf by using an image color correction algorithm.

* * * * *